US012743326B2

(12) United States Patent
Liu et al.

(10) Patent No.: US 12,743,326 B2
(45) Date of Patent: Sep. 22, 2026

(54) CALCULATION OF THE PARALLEL CAPACITY OF COMPUTER SYSTEMS BASED ON ITERATIVELY EXECUTING ACCORDING TO STEP VARIABLE

(71) Applicant: SAP SE, Walldorf (DE)

(72) Inventors: Jingyu Liu, Beijing (CN); Bizhong Ye, Beijing (CN)

(73) Assignee: SAP SE, Walldorf (DE)

( * ) Notice: Subject to any disclaimer, the term of this patent is extended or adjusted under 35 U.S.C. 154(b) by 689 days.

(21) Appl. No.: 18/206,961

(22) Filed: Jun. 7, 2023

(65) Prior Publication Data

US 2024/0411617 A1 Dec. 12, 2024

(51) Int. Cl.
*G06F 9/52* (2006.01)
*G06F 9/50* (2006.01)
*G06F 11/34* (2006.01)

(52) U.S. Cl.
CPC .................. *G06F 9/52* (2013.01); *G06F 9/50* (2013.01); *G06F 11/3409* (2013.01)

(58) Field of Classification Search
None
See application file for complete search history.

(56) References Cited

U.S. PATENT DOCUMENTS 5,854,754 A * 12/1998 Cabrera ................ G06F 9/5027 703/2
6,501,737 B1 * 12/2002 Mathal .................. H04L 47/824 370/347
2015/0293936 A1 * 10/2015 Yoshida .................... G06F 9/50 707/827
2016/0179508 A1 * 6/2016 Bates ........................ G06F 8/71 717/121
2017/0255491 A1 * 9/2017 Bradshaw ............... G06F 9/505
2023/0169359 A1 * 6/2023 Mizuno .................. G06N 5/022 706/12

OTHER PUBLICATIONS

Rao, Arjun, "A Template-Based Methodology for Evaluating Fashion Compatibility Using Large Language Models", (Apr. 2, 2025), 11 pgs.

* cited by examiner

*Primary Examiner* — Zujia Xu
(74) *Attorney, Agent, or Firm* — SCHWEGMAN LUNDBERG & WOESSNER, P.A.

(57) ABSTRACT

In an example embodiment, an iterative process is used to calculate the number of parallel work processes to set for a computer system. Specifically, an execution unit is started and the execution time for that execution unit is measured. This execution time for the single execution unit is called "unit time." Then a fixed number (e.g., 20) of execution units are started, and the execution times of each are measured. If the execution time consumption of each of the execution units is lower than some fixed threshold percentage of the unit time (e.g., 120%), then this means that the maximum parallel processing capacity is higher than the fixed number of execution unit. Then more execution units can be added and the process repeated until the execution units' execution times exceed that fixed threshold percentage.

20 Claims, 4 Drawing Sheets

CALCULATION OF THE PARALLEL CAPACITY OF COMPUTER SYSTEMS BASED ON ITERATIVELY EXECUTING ACCORDING TO STEP VARIABLE

TECHNICAL FIELD

This document generally relates to computer systems. More specifically, this document relates to the calculation of the parallel capacity of computer systems.

BACKGROUND

Computer systems may utilize parallel processing in order to process large amounts of tasks quickly. Parallel processing refers to the simultaneous execution of multiple tasks or instructions on a computing system. It allows a program or a set of instructions to be divided into smaller tasks that can be executed simultaneously, resulting in faster and more efficient processing.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
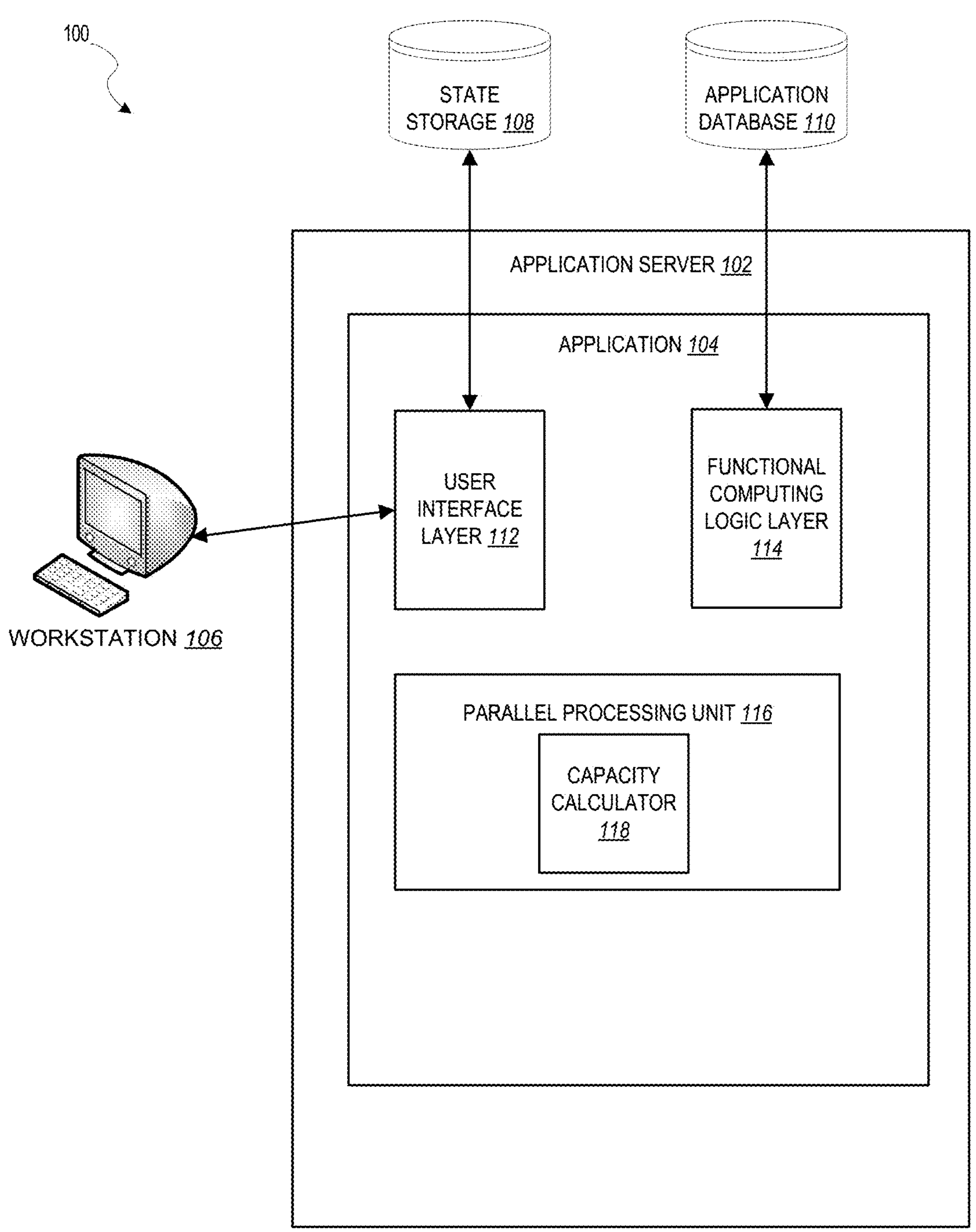
FIG. 1 illustrates a system comprising an application server, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Parallel processing can be achieved using multiple processors or multiple cores within a single processor. In a multi-processor system, each processor can execute a different instruction or task simultaneously. In a multi-core system, each core can execute a different task or instruction, allowing multiple tasks to be processed simultaneously.

There are different types of parallel processing, including task parallelism, data parallelism, and pipeline parallelism. Task parallelism involves dividing a program into multiple tasks that can be executed simultaneously. Data parallelism involves dividing a large dataset into smaller parts that can be processed simultaneously on different processors or cores. Pipeline parallelism involves dividing a program into smaller stages, where each stage can be executed simultaneously on different processors or cores.

One type of computer system that utilizes parallel processing is an application server. An application server is a software framework or platform that provides the infrastructure and services for developing, deploying, and managing web-based applications. It is designed to handle the processing and management of application code, database connectivity, and communication between the client and server components of an application.

An application server provides various services, including application hosting, load balancing, database connectivity, security, and session management. It allows developers to focus on building the application logic and user interface (UI), while the application server handles the underlying infrastructure and services.

The application server typically includes a web server component that handles the communication between the client and server components of the application using protocols such as HyperText Transfer Protocol (HTTP) and HyperText Transfer Protocol-Secure (HTTPS). It also includes an application container that provides the runtime environment for executing the application code.

In an example embodiment, a solution is provided to a technical issue that is encountered in computer systems running parallel processing, and especially in application servers running parallel processing. Specifically, if the application server sets the number of parallel work processes to be greater than the maximum parallel processing capacity of the application server, then performance will suffer. But at the beginning of processing, it is difficult to determine how many parallel work processes should be set. If the number is set too high, then when users use all the work processes at the same time, system performance is very slow, but if the number is set too low, then resources that might have otherwise been available go unused.

In parallel processing, an execution unit is a component of a processing element (PE) that performs the actual processing of instructions or tasks in parallel. It is responsible for executing a portion of a program or task assigned to it by the parallel processing system.

In a parallel processing system, multiple execution units may operate simultaneously to process different parts of a program or task, which can significantly improve the processing speed and efficiency of the system.

For example, in a parallel processing system that uses task parallelism, the program is divided into smaller tasks that can be executed independently by different processing elements. Each processing element has its own execution unit that performs the processing of the assigned tasks in parallel with other execution units.

In an example embodiment, an iterative process is used to calculate the number of parallel work processes to set for a computer system. Specifically, an execution unit is started and the execution time for that execution unit is measured. This execution time for the single execution unit is called "unit time." Then a fixed number (e.g., 20) of execution units are started, and the execution times of each are measured. If the execution time consumption of each of the execution units is lower than some fixed threshold percentage of the unit time (e.g., 120%), then this means that the maximum parallel processing capacity is higher than the fixed number of execution units. Then more execution units can be added, and the process repeated until the execution units' execution times exceed that fixed threshold percentage.

The process of determining the number of parallel work processes to set can be utilized in any computer system, but has specific applicability in application servers, since application servers commonly are running processes launched by multiple different users simultaneously and also often have computing resources that are somewhat flexible or at least not fixed. One specific example of an application server is the SAP Application Server from SAP SE of Walldorf, Germany.

SAP Application Server is a core component of the SAP system architecture, which enables the execution of SAP applications and provides the required infrastructure for managing and integrating the different components of the SAP system.

The SAP Application Server is designed to handle large amounts of data and processes, and can be configured to support a wide range of business operations. It comprises different components, including the Advanced Business Application Programming (ABAP) Application Server, the Java Application Server, and the Message Server.

The ABAP Application Server is responsible for executing ABAP-based applications, which are programs written in the ABAP programming language. The Java Application Server, on the other hand, is responsible for executing Java-based applications, which are programs written in the Java programming language.

The Message Server is responsible for managing communication between the different components of the SAP system, such as the application servers, the database servers, and the web servers.

The SAP Application Server provides various services, including application hosting, database connectivity, user management, system monitoring, and performance optimization. It also supports high availability and disaster recovery, ensuring that the SAP system can continue to operate even in the event of hardware or software failures.

FIG. 1 illustrates a system 100 comprising an application server 102, in accordance with an example embodiment. Here the application server 102 is described in terms of a stateful server, which is a server running a stateful application. In other words, an application 104 running on the application server 102 is executed in such a manner that to the workstation 106 the application 104 behaves like an ordinary stateless application. However, fully stateful or fully stateless implementations are possible as well.

The system 100 includes the application server 102, a state storage 108, and an application database (DB) 110. The application 104 may include a UI layer 112 and a functional computing logic layer 114. The UI layer 112 may cause a graphical user interface (GUI) to be presented on a workstation 106. The respective layers (a UI layer 112 and a functional computing logic layer 114) may include modules containing software code executable by a processor in workstation 106. A request issued from a browser under control of a processor executing on a workstation 106 may be received by the UI layer 112. The request may include data related to the user (e.g., password, logon ID, and the like). The functional computing logic layer 114 may be executable code related to a functional computer process such as invoicing, human resources management, and/or the like. However, the functional computing logic layer log can be related to any suitable process, such as file management.

The user may be authenticated via the UI layer 112 executing on the computer processor, and a session ID may be generated. The session ID may be generated by a UI framework (e.g., the Business Server Pages (BSP) application framework) executing on the application server 102 and in combination with processing at the UI layer 112. The processor executing the UI layer 112, using the session ID, may retrieve associated with the data of the session ID from, for example, the state storage 108. The state storage 108 may be any data storage capable of storing the server side cookies and accessible by the processor. Since the user session ID may be a small amount of data and may be easily passed between functions within the application server 102, the user session ID may be used as a primary key when storing the cookie in state storage 108.

The processor may use the UI layer 112 to restore a user context (or state) from a state representation derived from the cookies. The user context may be made up of system and application variables. Since system variables (SY variables) may not be set by the application 104 directly, the components of the application (functional computing logic layer 114 or UI layer 112) that may use the SY variable may be configured to utilize the respective SY variables on a case-by-case basis.

Furthermore, since most SY variables are only consumed during a single dialog session, the likelihood of errors related to them is rather low.

Based on the state representation stored in the retrieved cookie, the functionality of the UI layer 112 may cause the processor to restore the user context by setting all necessary static variables of the function modules, the global variables, and the like, related to the authenticated user. The functional computing logic layer 114 may be called using the restored user context.

The functional computing logic layer 114 may cause the processor to access the application database 110 and/or may set or release locks based on the data requested for use by the workstation 106. Locks may be managed by a lock manager, e.g., the SAP Enqueue server.

The application database 110 may contain a lock storage, e.g., a database table, operated on by a lock manager that maintains the status of all locks for each session. After the functional computing logic layer 114 has completed retrieving data, the functionality of UI layer 112 may cause the processor to assemble a state representation of the current user session.

After the state representation is assembled, the user context may be stored as a cookie in the state storage 108. The UI layer 112 may generate the HyperText Markup Language (HTML) containing the data requested by the workstation 106 for rendering by the browser on the workstation 106. The UI layer 112 may use the restored user context when generating the HTML for rendering by the browser.

This process may be repeated for multiple different workstations, which may access and run the application 104 in parallel. A parallel processing unit 116 may manage the multiple parallel executions and specifically run multiple parallel execution units. These execution units may be allocated based on a predetermined maximum number of execution units for the application server 102. As mentioned earlier, it can be difficult to pick how many execution units to assign as this predetermined maximum number of execution units (the capacity of the application server 102). As such, the parallel processing unit may include a capacity calculator 118 that performs various methods described herein to calculate the capacity.

Figure 2:
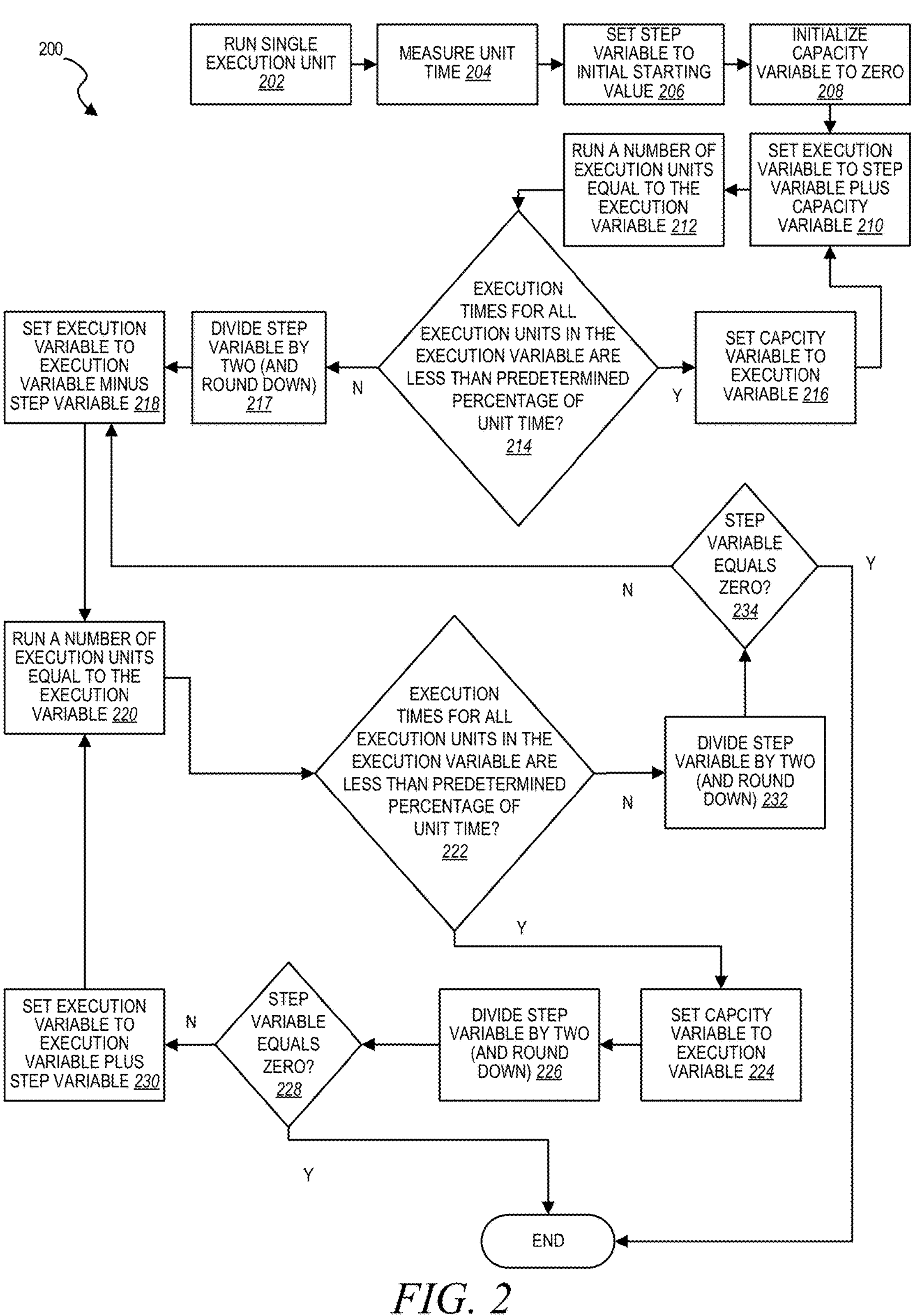
FIG. 2 is a flow diagram illustrating a method, in accordance with an example embodiment, for calculating parallel processing capacity of a computer system.

FIG. 2 is a flow diagram illustrating a method 200, in accordance with an example embodiment, for calculating parallel processing capacity of a computer system. At operation 202, a single execution unit is run. At operation 204, the running time of the single execution unit is measured. At operation 206, a step variable is set to a particular initial starting value (e.g., 20). At operation 208, capacity variable is initialized to 0.

At operation 210, the execution variable is set to the value currently assigned to the step variable plus the capacity variable (which is 0 when operation 210 is run the first time but, as will be seen, will be different upon subsequent executions of operation 210). At operation 212, a number of execution units equal to the value currently assigned to the execution variable are run. At operation 214, it is determined if the execution time for each of the execution units in the execution variable is less than a predetermined percentage of the running time of the single execution unit (i.e., the unit time) from operation 204. If so, then at operation 216, the capacity variable is set to the current value of the execution variable. Then the method 200 loops back to operation 210. Thus, essentially this loop means that the capacity value is repeatedly increased by the value assigned to the step variable until at least one of the measured execution times for the run execution units is greater than the predetermined percentage of the unit time.

At this point, the system has essentially learned a maximum possible value for the number of execution units, but it does not know if that is the actual number of execution units that can be allocated. An additional loop is needed for that. Thus, once it is determined at operation 214 that at least one of the execution times met or exceeded the predetermined percentage of unit time, then at operation 217, the step variable is divided by two (and rounded down). Then, at operation 218, the execution variable is set to the current value of the execution variable minus the current value of the step variable. Then at operation 220, a number of execution units equal to the value currently assigned to the execution unit variable are run. At operation 222, it is determined if the execution time for each of the execution units in the execution variable is less than a predetermined percentage of the running time of the single execution unit (i.e., the unit time) from operation 204. If so, then at operation 224, the capacity variable is set to the current value of the execution variable. Then at operation 226, the value of the step variable is set to its current value divided by 2 (rounded down to the nearest integer). Then, at operation 228, it is determined if the value of the step variable is 0. If so, then the method 200 ends. If not, then at operation 230, the execution variable is set to the current value of the execution variable plus the current value of the step value, and the method 200 loops back to operation 220.

If at operation 222 it was determined that the execution time for at least one execution unit in the number of execution units run is greater than or equal to the predetermined percentage of the running time of the single execution unit, then at operation 232, the value of the step variable is set to its current value divided by 2 (rounded down to the nearest integer). Then at operation 234, it is determined if the value of the step variable is 0. If so, then the method 200 ends. If not, then the method 200 loops back to operation 218.

It should be noted that in some example embodiments, machine learning may be used to further improve the method 200 of FIG. 2. Specifically, the initial starting value for the step variable may be produced automatically by a machine learning model rather than set empirically by an administrator.

For example, a machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the machine learning model may take place as a dedicated training phase. In other example embodiments, the machine learning model may be retrained dynamically at runtime by the user providing live feedback.

The training data in this case may be historical information regarding executions of the method 200 in the past and specifically how many iterations of the method 200 it took to locate the final capacity number, as well as various system parameters (e.g., type of application server, number of hardware processors, speed of hardware processors, etc.) that can be used to predict an optimal or near-optimal initial step variable value. The machine learning model may be trained to minimize the number of iterations of the method 200 in order to achieve improvements in processing efficiency (e.g., reduce the number of processing cycles needed to execute the method 200).

In view of the disclosure above, various examples are set forth below. It should be noted that one or more features of an example, taken in isolation or combination, should be considered within the disclosure of this application.

Example 1. A system comprising:
- at least one hardware processor; and
- a computer-readable medium storing instructions that, when executed by the at least one hardware processor, cause the at least one hardware processor to perform operations comprising:
- operating a first execution unit in a parallel processing system for a unit time until the first execution unit has completed operating;
- calculating a temporary maximum capacity of the parallel processing system by repeatedly increasing a step variable used when executing a first number of execution units until the execution time of at least one of the first number of execution units meets or exceeds a predetermined percentage of the unit time; and
- calculating a final maximum capacity of the parallel processing system based on execution of a second number of execution units being equal to the temporary maximum capacity.

Example 2. The system of Example 1, wherein the calculating the temporary maximum capacity includes executing a first number of execution units equal to a capacity variable in the parallel processing system until the first number of execution units have all completed execution, comparing the execution times of the executing to a predetermined percentage of the unit time, and repeating the executing and comparing with the first number of execution numbers increasing by a step variable until the execution time of at least one of the first number of execution units meets or exceeds the predetermined percentage of the unit time.

Example 3. The system of Example 2, wherein the calculating the final maximum capacity includes repeatedly reducing the temporary maximum capacity by the step variable, running a second number of execution units equal to the temporary maximum capacity in the parallel processing system until the second number of execution units have all completed running, comparing running times of the second number of execution units to a predetermined percentage of the unit time, reducing the step variable by half, and either increasing or decreasing the second number of execution units by the step variable depending upon whether the running time of at least one of the second number of execution units meets or exceeds the predetermined percentage of the unit time, until the step variable is zero, at which point the final maximum capacity of the parallel processing system is determined to be equal to the second number of execution units.

Example The system of Example 3, wherein the operations further comprise:

setting the step variable to an initial starting value; and
initializing the capacity variable to zero.

Example 5. The system of Example 4, wherein the calculating the temporary maximum capacity comprises:

setting the execution variable to the step variable plus the capacity variable;

executing a number of execution units equal to the execution unit variable; and in response to a determination that an execution time for each of the number of execution units is less than the predetermined percentage of unit time, setting the capacity variable equal to the execution variable and repeating the operations of the calculating the temporary maximum capacity, wherein the temporary maximum capacity is equal to the execution unit when repeating ends.

Example 6. The system of Example 4, wherein the calculating a final maximum capacity comprises:

setting the execution variable to the execution variable minus the step variable;

running a number of execution units equal to the execution unit variable;

in response to a determination that an execution time for each of the number of execution units is less than the predetermined percentage of unit time, setting the step variable to the step variable divided by two, and in response to a determination that the step variable is zero, assigning the execution variable as the final maximum capacity.

Example 7. The system of Example 6, wherein the calculating a final maximum capacity further comprises:

in response to a determination that an execution time for at least one of the number of execution units is greater than or equal to the predetermined percentage of unit time, setting the capacity variable equal to the execution variable, setting the step variable to the step variable divided by two, and in response to a determination that the step variable is zero, assigning the execution variable as the final maximum capacity.

Example 8. The system of any of Examples 4-7, wherein the initial starting value for the step variable is determined by output of a machine learning model trained to output a step value for the parallel processing system based at least in part on training data used to train the machine learning model.

Example 9. The system of Example 8, wherein the training data includes prior executions of the operations for parallel processing systems other than the parallel processing system.

Example 10. A method comprising:

operating a first execution unit in a parallel processing system for a unit time until the first execution unit has completed operating;

calculating a temporary maximum capacity of the parallel processing system by repeatedly increasing a step variable used when executing a first number of execution units until the execution time of at least one of the first number of execution units meets or exceeds a predetermined percentage of the unit time; and calculating a final maximum capacity of the parallel processing system based on execution of a second number of execution units being equal to the temporary maximum capacity.

Example 11. The method of Example 10, wherein the calculating the temporary maximum capacity includes executing a first number of execution units equal to a capacity variable in the parallel processing system until the first number of execution units have all completed execution, comparing the execution times of the executing to a predetermined percentage of the unit time, and repeating the executing and comparing with the first number of execution numbers increasing by a step variable until the execution time of at least one of the first number of execution units meets or exceeds the predetermined percentage of the unit time.

Example 12. The method of Example 11, wherein the calculating the final maximum capacity includes repeatedly reducing the temporary maximum capacity by the step variable, running a second number of execution units equal to the temporary maximum capacity in the parallel processing system until the second number of execution units have all completed running, comparing running times of the second number of execution units to a predetermined percentage of the unit time, reducing the step variable by half, and either increasing or decreasing the second number of execution units by the step variable depending upon whether the running time of at least one of the second number of execution units meets or exceeds the predetermined percentage of the unit time, until the step variable is zero, at which point the final maximum capacity of the parallel processing system is determined to be equal to the second number of execution units.

Example 13. The method of Example 12, further comprising:

setting the step variable to an initial starting value; and
initializing the capacity variable to zero.

Example 14. The method of Example 13, wherein the calculating the temporary maximum capacity comprises:

setting the execution variable to the step variable plus the capacity variable;

executing a number of execution units equal to the execution unit variable; and in response to a determination that an execution time for each of the number of execution units is less than the predetermined percentage of unit time, setting the capacity variable equal to the execution variable and repeating the operations of the calculating the temporary maximum capacity, wherein the temporary maximum capacity is equal to the execution unit when repeating ends.

Example 15. The method of Examples 13 or 14, wherein the calculating a final maximum capacity comprises:

setting the execution variable to the execution variable minus the step variable;

running a number of execution units equal to the execution unit variable;

in response to a determination that an execution time for each of the number of execution units is less than the predetermined percentage of unit time, setting the step variable to the step variable divided by two, and in response to a determination that the step variable is zero, assigning the execution variable as the final maximum capacity.

Example 16. The method of Example 15, wherein the calculating a final maximum capacity further comprises:

in response to a determination that an execution time for at least one of the number of execution units is greater than or equal to the predetermined percentage of unit time, setting the capacity variable equal to the execution variable, setting the step variable to the step variable divided by two, and in response to a determination that the step variable is zero, assigning the execution variable as the final maximum capacity.

Example 17. The method of any of Examples 13-16, wherein the initial starting value for the step variable is determined by output of a machine learning model trained to output a step value for the parallel processing system based at least in part on training data used to train the machine learning model.

Example 18. The method of Example 17, wherein the training data includes prior executions of the operations for parallel processing systems other than the parallel processing system.

Example 19. A non-transitory machine-readable medium storing instructions which, when executed by one or more processors, cause the one or more processors to perform operations comprising:

operating a first execution unit in a parallel processing system for a unit time until the first execution unit has completed operating;

calculating a temporary maximum capacity of the parallel processing system by repeatedly increasing a step variable used when executing a first number of execution units until the execution time of at least one of the first number of execution units meets or exceeds a predetermined percentage of the unit time; and calculating a final maximum capacity of the parallel processing system based on execution of a second number of execution units being equal to the temporary maximum capacity.

Example 20. The non-transitory machine-readable medium of Example 19, wherein the calculating the temporary maximum capacity includes executing a first number of execution units equal to a capacity variable in the parallel processing system until the first number of execution units have all completed execution, comparing the execution times of the executing to a predetermined percentage of the unit time, and repeating the executing and comparing with the first number of execution numbers increasing by a step variable until the execution time of at least one of the first number of execution units meets or exceeds the predetermined percentage of the unit time.

Figure 3:
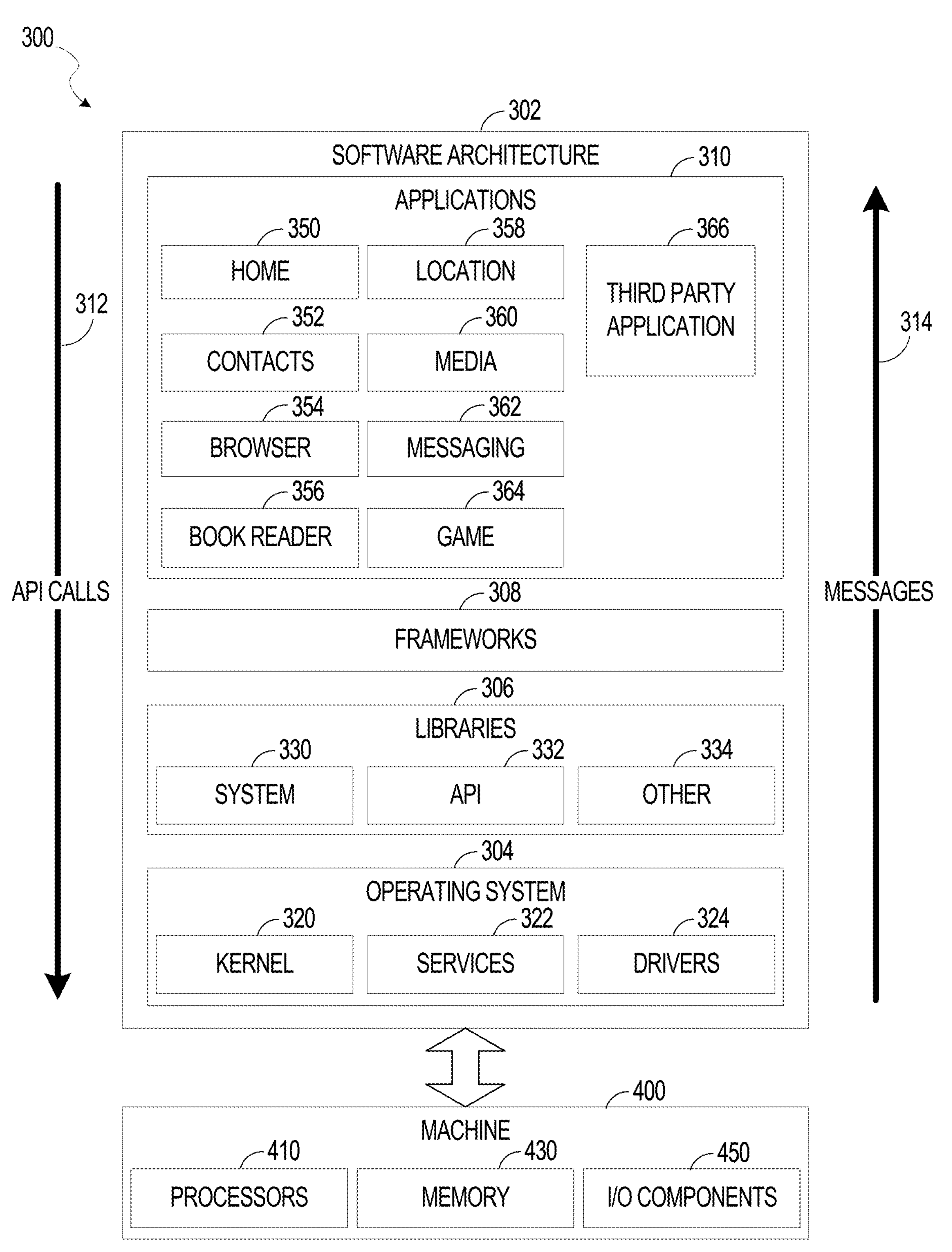
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
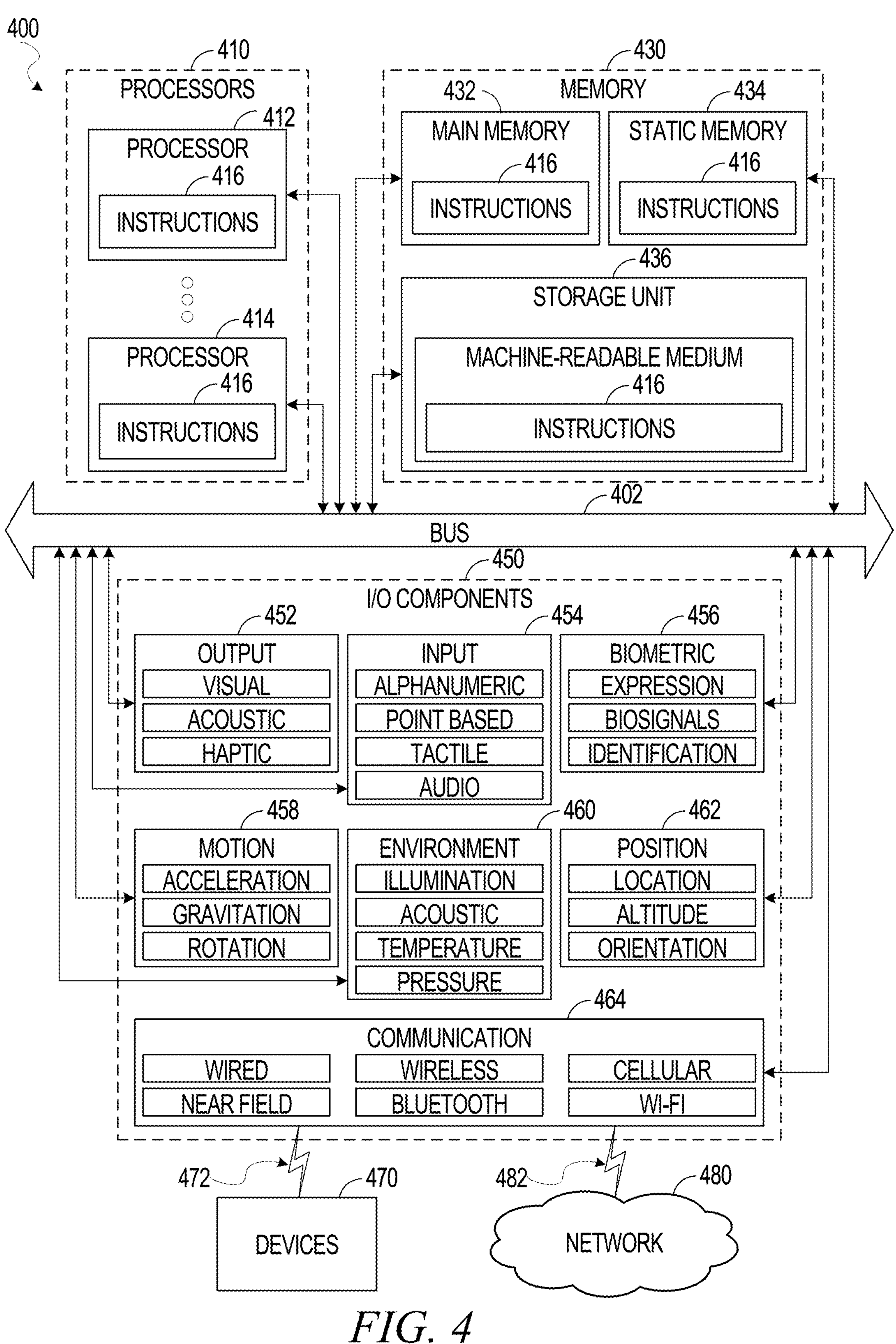
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

operating a first execution unit in a parallel processing system until the first execution unit completes operating;

measuring a unit time, the unit time being equal to an amount of time the first execution unit operated during the operating;

iteratively executing a first number of execution units in the parallel processing system and increasing the first number of execution units by a step variable to calculate a temporary maximum capacity of the parallel processing system, wherein the iteratively executing comprises continuing calculating the temporary maximum capacity of the parallel processing system by repeatedly increasing the step variable used when executing the first number of execution units until an execution time of at least one of the first number of execution units meets or exceeds a predetermined percentage of the unit time of the first execution unit;

iteratively executing a second number of execution units in the parallel processing system to calculate a final maximum capacity of the parallel processing system, the second number of execution units being initially equal to the temporary maximum capacity and being reduced in each iteration by the step variable, the final maximum capacity being determined based on whether execution times of the second number of execution units meet or exceed the predetermined percentage of the unit time of the first execution unit;

setting a maximum number of parallel execution units for the parallel processing system equal to the final maximum capacity; and operating the parallel processing system with no more than the maximum number of parallel execution units.

2. The system of claim 1, wherein the first number of execution units is equal to a capacity variable and wherein the calculating the temporary maximum capacity includes executing the first number of execution units in the parallel processing system until the first number of execution units have all completed execution, comparing execution times of the executing to the predetermined percentage of the unit time, and repeating the executing and comparing with the first number of execution units increasing by the step variable until the execution time of at least one of the first number of execution units meets or exceeds the predetermined percentage of the unit time.

3. The system of claim 2, wherein the second number of execution units is set equal to the temporary maximum capacity and wherein the calculating the final maximum capacity includes repeatedly reducing the temporary maximum capacity by the step variable, running the second number of execution units in the parallel processing system until the second number of execution units have all completed running, comparing running times of the second number of execution units to the predetermined percentage of the unit time, reducing the step variable by half, and either increasing or decreasing the second number of execution units by the step variable depending upon whether a running time of at least one of the second number of execution units meets or exceeds the predetermined percentage of the unit time, until the step variable is zero, at which point the final maximum capacity of the parallel processing system is determined to be equal to the second number of execution units.

4. The system of claim 3, wherein the operations further comprise:

setting the step variable to an initial starting value; and initializing the capacity variable to zero.

5. The system of claim 4, wherein the calculating the temporary maximum capacity comprises:

setting an execution variable to the step variable plus the capacity variable;

executing a number of execution units equal to the execution variable; and in response to a determination that an execution time for each of the number of execution units is less than the predetermined percentage of unit time, setting the capacity variable equal to the execution variable and repeating the operations of the calculating the temporary maximum capacity, wherein the temporary maximum capacity is equal to the execution unit when repeating ends.

6. The system of claim 4, wherein the calculating a final maximum capacity comprises:

setting an execution variable to the execution variable minus the step variable;

running a number of execution units equal to the execution variable;

in response to a determination that an execution time for each of the number of execution units is less than the predetermined percentage of unit time, setting the step variable to the step variable divided by two, and in response to a determination that the step variable is zero, assigning the execution variable as the final maximum capacity.

7. The system of claim 6, wherein the calculating a final maximum capacity further comprises:

in response to a determination that an execution time for at least one of the number of execution units is greater than or equal to the predetermined percentage of unit time, setting the capacity variable equal to the execution variable, setting the step variable to the step variable divided by two, and in response to a determination that the step variable is zero, assigning the execution variable as the final maximum capacity.

8. The system of claim 4, wherein the initial starting value for the step variable is determined by output of a machine learning model trained to output a step value for the parallel processing system based at least in part on training data used to train the machine learning model.

9. The system of claim 8, wherein the training data includes prior executions of the operations for parallel processing systems other than the parallel processing system.

10. A method comprising:

operating a first execution unit in a parallel processing system until the first execution unit completes operating;

measuring a unit time, the unit time being equal to an amount of time the first execution unit operated during the operating;

iteratively executing a first number of execution units in the parallel processing system and increasing the first number of execution units by a step variable to calculate a temporary maximum capacity of the parallel processing system, wherein the iteratively executing comprises continuing calculating the temporary maximum capacity of the parallel processing system by repeatedly increasing the step variable used when executing the first number of execution units until an execution time of at least one of the first number of execution units meets or exceeds a predetermined percentage of the unit time of the first execution unit;

iteratively executing a second number of execution units in the parallel processing system to calculate a final maximum capacity of the parallel processing system, the second number of execution units being initially equal to the temporary maximum capacity and being reduced in each iteration by the step variable, the final maximum capacity being determined based on whether execution times of the second number of execution units meet or exceed the predetermined percentage of the unit time of the first execution unit;

setting a maximum number of parallel execution units for the parallel processing system equal to the final maximum capacity; and operating the parallel processing system with no more than the maximum number of parallel execution units.

11. The method of claim 10, wherein the first number of execution units is equal to a capacity variable and wherein the calculating the temporary maximum capacity includes executing the first number of execution units in the parallel processing system until the first number of execution units have all completed execution, comparing execution times of the executing to the predetermined percentage of the unit time, and repeating the executing and comparing with the first number of execution units increasing by the step variable until the execution time of at least one of the first number of execution units meets or exceeds the predetermined percentage of the unit time.

12. The method of claim 11, wherein the second number of execution units is set equal to the temporary maximum capacity and wherein the calculating the final maximum capacity includes repeatedly reducing the temporary maximum capacity by the step variable, running the second number of execution units in the parallel processing system until the second number of execution units have all completed running, comparing running times of the second number of execution units to the predetermined percentage of the unit time, reducing the step variable by half, and either increasing or decreasing the second number of execution units by the step variable depending upon whether a running time of at least one of the second number of execution units meets or exceeds the predetermined percentage of the unit time, until the step variable is zero, at which point the final maximum capacity of the parallel processing system is determined to be equal to the second number of execution units.

13. The method of claim 12, further comprising:

setting the step variable to an initial starting value; and initializing the capacity variable to zero.

14. The method of claim 13, wherein the calculating the temporary maximum capacity comprises:

setting an execution variable to the step variable plus the capacity variable;

executing a number of execution units equal to the execution variable; and in response to a determination that an execution time for each of the number of execution units is less than the predetermined percentage of unit time, setting the capacity variable equal to the execution variable and repeating the operations of the calculating the temporary maximum capacity, wherein the temporary maximum capacity is equal to the execution unit when repeating ends.

15. The method of claim 13, wherein the calculating a final maximum capacity comprises:

setting an execution variable to the execution variable minus the step variable;

running a number of execution units equal to the execution variable;

in response to a determination that an execution time for each of the number of execution units is less than the predetermined percentage of unit time, setting the step variable to the step variable divided by two, and in response to a determination that the step variable is zero, assigning the execution variable as the final maximum capacity.

16. The method of claim 15, wherein the calculating a final maximum capacity further comprises:

in response to a determination that an execution time for at least one of the number of execution units is greater than or equal to the predetermined percentage of unit time, setting the capacity variable equal to the execution variable, setting the step variable to the step variable divided by two, and in response to a determination that the step variable is zero, assigning the execution variable as the final maximum capacity.

17. The method of claim 13, wherein the initial starting value for the step variable is determined by output of a machine learning model trained to output a step value for the parallel processing system based at least in part on training data used to train the machine learning model.

18. The method of claim 17, wherein the training data includes prior executions of the operations for parallel processing systems other than the parallel processing system.

19. A non-transitory machine-readable medium storing instructions which, when executed by one or more processors, cause the one or more processors to perform operations comprising:

operating a first execution unit in a parallel processing system until the first execution unit completes operating;

measuring a unit time, the unit time being equal to an amount of time the first execution unit operated during the operating;

iteratively executing a first number of execution units in the parallel processing system and increasing the first number of execution units by a step variable to calculate a temporary maximum capacity of the parallel processing system, wherein the iteratively executing comprises continuing calculating the temporary maximum capacity of the parallel processing system by repeatedly increasing the step variable used when executing the first number of execution units until an execution time of at least one of the first number of execution units meets or exceeds a predetermined percentage of the unit time of the first execution unit;

iteratively executing a second number of execution units in the parallel processing system to calculate a final maximum capacity of the parallel processing system, the second number of execution units being initially equal to the temporary maximum capacity and being reduced in each iteration by the step variable, the final maximum capacity being determined based on whether execution times of the second number of execution units meet or exceed the predetermined percentage of the unit time of the first execution unit;

setting a maximum number of parallel execution units for the parallel processing system equal to the final maximum capacity; and operating the parallel processing system with no more than the maximum number of parallel execution units.

20. The non-transitory machine-readable medium of claim 19, wherein the first number of execution units is equal to a capacity variable and wherein the calculating the temporary maximum capacity includes executing the first number of execution units in the parallel processing system until the first number of execution units have all completed execution, comparing execution times of the executing to the predetermined percentage of the unit time, and repeating the executing and comparing with the first number of execution units increasing by the step variable until the execution time of at least one of the first number of execution units meets or exceeds the predetermined percentage of the unit time.

* * * * *